US010710025B2

(12) United States Patent
Sun et al.

(10) Patent No.: US 10,710,025 B2
(45) Date of Patent: Jul. 14, 2020

(54) INORGANIC FIBROUS MEMBRANE AND A METHOD OF FABRICATING THEREOF

(71) Applicants: Delai Darren Sun, Singapore (SG); Jincheng Liu, Singapore (SG); Tong Zhang, Singapore (SG)

(72) Inventors: Delai Darren Sun, Singapore (SG); Jincheng Liu, Singapore (SG); Tong Zhang, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 1036 days.

(21) Appl. No.: 14/252,248

(22) Filed: Apr. 14, 2014

(65) Prior Publication Data

US 2014/0305864 A1    Oct. 16, 2014

Related U.S. Application Data

(60) Provisional application No. 61/811,413, filed on Apr. 12, 2013.

(51) Int. Cl.
| | |
|---|---|
| *B01D 67/00* | (2006.01) |
| *B01D 71/02* | (2006.01) |
| *B01D 71/82* | (2006.01) |
| *B01D 69/10* | (2006.01) |
| *B01D 69/02* | (2006.01) |

(52) U.S. Cl.
CPC ......... *B01D 67/0093* (2013.01); *B01D 69/02* (2013.01); *B01D 69/10* (2013.01); *B01D 69/105* (2013.01); *B01D 71/024* (2013.01); *B01D 71/82* (2013.01)

(58) Field of Classification Search
None
See application file for complete search history.

(56) References Cited

U.S. PATENT DOCUMENTS

2010/0233812 A1*  9/2010  Sun ............... B01D 67/0039
                                                435/401

OTHER PUBLICATIONS

Chen et al., Synthesis of Visible-Light Responsive Graphene Oxide/TiO2 Composites with p/n Heterojunction, 4 ACS Nano, 6425, 6425-6423 (2010).*
Zarrin et al., Functionalized Graphene Oxide Nanocomposite Membrane for Low Humidity and High Temperature Proton Exchange Membrane Fuel Cells, 115 J. Phys. Chem. C, 20774, 20774-20781 (2011).*
Chen et al., Synthesis of Visible-Light Responsive Graphene Oxide/TiO2 Composites with p/n Heterojunction, 4 ACS Nano, 6425, 6425-6423 (2010). (Year: 2010).*

(Continued)

*Primary Examiner* — Krishnan S Menon
*Assistant Examiner* — Brad Gordon
(74) *Attorney, Agent, or Firm* — Sughrue Mion, PLLC

(57) ABSTRACT

A method of fabricating an inorganic fibrous membrane, the method comprising the steps of: grafting sulfonated graphene oxide onto a scaffold of inorganic nanofibers to form a suspension of heterojunctions of the sulfonated graphene oxide and the scaffold; filtering the suspension through a support to obtain heterojunctions on the support; drying the heterojunctions on the support; and removing the support to obtain the inorganic fibrous membrane.

5 Claims, 11 Drawing Sheets

(56) References Cited

OTHER PUBLICATIONS

Zarrin et al., Functionalized Graphene Oxide Nanocomposite Membrane for Low Humidity and High Temperature Proton Exchange Membrane Fuel Cells, 115 J. Phys. Chem. C, 20774, 20774-20781 (2011). (Year: 2011).*

Shin-ichi Nakao, "Determination of pore size and pore size distribution 3. Filtration membranes", Journal of Membrane Science, 1994, vol. 96, pp. 131-165 (35 pages total).

Tong Zhang et al., "Fabrication of magnetic cryptomelane-type manganese oxide nanowires for water treatment", Chem. Commun., The Royal Society of Chemistry, 2011, vol. 47, pp. 1890-1892 (3 pages total).

Youyu Wu et al., "Microwave-assisted hydrolysis of crystalline cellulose catalyzed by biomass char sulfonic acids", Green Chem., The Royal Society of Chemistry, Feb. 24, 2010, vol. 12, pp. 696-700 (5 pages total).

Mai Okamura et al., "Acid-Catalyzed Reactions on Flexible Polycyclic Aromatic Carbon in Amorphous Carbon", Chem Mater., American Chemical Society, Jun. 3, 2006, vol. 18, No. 13, pp. 3039-3045 (7 pages total).

Sanjai J. Parikh et al., "FTIR Spectroscopic Study of Biogenic Mn-Oxide Formation by *Pseudomonas putida* GB-1", Geomicrobiology Journal, 2005, vol. 22, No. 5, pp. 207-218 (13 pages total).

Laishun Shi et al., "Catalytic oxidation and spectroscopic analysis of simulated wastewater containing o-chlorophenol by using chlorine dioxide as oxidant" Journal of Hazardous Materials, 2010, vol. 178, pp. 1137-1140 (4 pages total).

Hua-Ming Li et al., "Synthesis and physical properties of sulfonated syndiotactic polystyrene ionomers", Polymer International, Society of Chemical Industry, 2001, vol. 50, pp. 421-428 (8 pages total).

Karthikeyan Krishnamoorthy et al., "Graphene oxide as a photocatalytic material", Applied Physics Letters, Jun. 13, 2011, vol. 98, pp. 244101-1-244101-3 (4 pages total).

G.I. Titelman et al., "Characteristics and microstructure of aqueous colloidal dispersions of graphite oxide", Carbon, vol. 43, 2005, pp. 641-649 (9 pages total).

Tamás Szabó et al., "DRIFT study of deuterium-exchanged graphite oxide", Letters to the Editor, Carbon, vol. 43, Sep. 1, 2005, pp. 3186-3189 (4 pages total).

Jincheng Liu et al., "Synthesis of graphene soluble in organic solvents by simultaneous ether-functionalization with octadecane groups and reduction", Materials Letters, vol. 64, 2010, pp. 2236-2239 (4 pages total).

Xiaobin Fan et al., "Deoxygenation of Exfoliated Graphite Oxide under Alkaline Conditions: A Green Route to Graphene Preparation", Advanced Materials, 2008, vol. 20, pp. 4490-4493 (4 pages total).

Pinggui Liu et al., "Preparation and characterization of poly(vinyl acetate)-intercalated graphite oxide nanocomposite", Journal of Materials Chemistry, Feb. 7, 2000, vol. 10, pp. 933-935 (3 pages total).

William S. Hummers et al., "Preparation of Graphitic Oxide", Baroid Division, National Lead Company, Mar. 20, 1958, p. 1339 (1 page total).

Jincheng Liu et al., "Self-Assembling $TiO_2$ Nanorods on Large Graphene Oxide Sheets at a Two-Phase Interface and Their Anti-Recombination in Photocatalytic Applications" Advanced Functional Materials, 2010, vol. 20, pp. 4175-4181 (7 pages total).

Chengmeng Chen et al., "Self-Assembled Free-Standing Graphite Oxide Membrane", Advanced Materials, 2009, vol. 21, pp. 3007-3011 (5 pages total).

Dmitriy A. Dikin et al., "Preparation and characterization of graphene oxide paper", Nature Publishing Group, Jul. 26, 2007, vol. 448, pp. 457-460 (4 pages total).

C.N.R. Rao et al., "Graphene: The New Two-Dimensional Nanomaterial", Angewandte Chemie, 2009, vol. 48, pp. 7752-7777 (26 pages total).

A.K. Geim, "Graphene: Status and Prospects", Science, Jun. 19, 2009, vol. 324, pp. 1530-1534 (6 pages total).

Xue Bin Ke et al., "High-Performance Ceramic Membranes with a Separation Layer of Metal Oxide Nanofibers", Advanced Materials, 2007, vol. 19, pp. 785-790 (6 pages total).

Punit Kohli et al., "DNA-Functionalized Nanotube Membranes with Single-Base Mismatch Selectivity", Science, Aug. 13, 2004, vol. 305, pp. 984-986 (4 pages total).

Wenzhao Jia et al., "Nanoengineered Transparent, Free-Standing, Conductive Nanofibrous Membranes", J. Phys, Chem C., American Chemical Society, Oct. 20, 2009, vol. 113, No. 45, pp. 19525-19530 (6 pages total).

Tong Zhang et al., "A free-standing, hybrid $TiO_2$/K-OMS-2 hierarchical nanofibrous membrane with high photocatalytic activity for concurrent membrane filtration applications", RSC Advances, Mar. 1, 2012, vol. 2, pp. 3638-3641 (4 pages total).

Qunyin Xu et al., "Synthesis of porosity controlled ceramic membranes", J. Mater. Res., Materials Research Society, May 1991, vol. 6, No. 5, pp. 1073-1081 (9 pages total).

Xiwang Zhang et al., "High-Performance Multifunctional $TiO_2$ Nanowire Ultrafiltration Membrane with a Hierarchical Layer Structure for Water Treatment", Advanced Functional Materials, 2009, vol. 19, pp. 3731-3736 (6 pages total).

Jikang Yuan et al., "Superwetting nanowire membranes for selective absorption", Nature Publishing Group, 2008, vol. 3, pp. 332-336 (5 pages total).

Hai-Wei Liang et al., "Robust and Highly Efficient Free-Standing Carbonaceous Nanofiber Membranes for Water Purification", Advanced Functional Materials, 2011, vol. 21, pp. 3851-3858 (8 pages total).

Ryouhei Takemori et al., "Electrospun nanofibrous blend membranes for fuel cell electrolytes", Journal of Power Sources, vol. 195, 2010, pp. 5957-5961 (5 pages total).

Dayong Yang et al., "Electrospun Nanofibrous Membranes: A Novel Solid Substrate for Microfluidic Immunoassays for HIV", Advanced Materials, 2008, vol. 20, pp. 4770-4775 (6 pages total).

David S. Sholl et al., "Making High-Flux Membranes with Carbon Nanotubes", Science, May 19, 2006, vol. 312, pp. 1003-1004 (3 pages total).

Kuitian Tan et al., "Fabrication and evaluation of electrospun nanofibrous antimicrobial nylon 6 membranes", Journal of Membrane Science, vol. 305, Aug. 15, 2007, pp. 287-298 (12 pages total).

* cited by examiner

INORGANIC FIBROUS MEMBRANE AND A METHOD OF FABRICATING THEREOF

FIELD OF THE INVENTION

This invention relates to an inorganic fibrous membrane and a method for fabricating thereof.

BACKGROUND OF THE INVENTION

Inorganic nanofibrous membranes have recently attracted increasing attention in the fields of catalysis, adsorption, fuel cells, sensors and filtration.[1-6] In view of their mechanical resistance and excellent performance in the removal of pollutants, inorganic nanofibrous membranes with different structures and properties have been successfully applied for water purification.[5-7] Successful application of inorganic membranes in water purification will depend upon the ability to prepare membranes with the desired pore size,[8] which would affect the selectivity and permeability of the membrane.

Previous studies have shown that various techniques such as self-assembly, electrospinning and selective etching of templates can be used to synthesize inorganic nanofibrous membranes.[6,7,9,10] Unfortunately, these techniques for membrane synthesis suffer from poor selectivity and permeability, complicated technical requirements and high operational costs, thus severely restricting water purification applications.[6,11] As the final step during the preparation of a traditional inorganic membrane, calcination is very important for controlling the pore size and pore structure of the membrane.[12] Although it can downsize membrane pores and thus enhance membrane selectivity, this process often leads to the formation of pinholes and cracks within the membrane as well as an energy cost.[13]

Therefore, there is a growing need to develop a facile and economical method to fabricate inorganic nanofibrous membranes with good selectivity and permeability. Graphene and its derivatives are promising candidates for potential applications in nanoelectronics, nanomedicine, supercapacitors and nanosensors due to their exceptional electronic, thermal, mechanical and optical properties.[14,15] Current progress shows that free-standing graphene oxide (GO) paper can be formed by flow-directed assembly of individual graphene oxide sheets, since a stable suspension of GO can be obtained with the assistance of ultrasonic treatment.[16,17] Although the GO paper exhibits excellent flexibility and high mechanical strength, it is not suitable for water filtration due to its poor permeability to fluids.[16]

SUMMARY OF INVENTION

In general, the present invention provides a method to produce a novel type of free-standing and flexible inorganic membranes using novel functionalized graphene oxide based crosslinking agents without calcination. One possible way of harnessing the advantages of GO for water filtration is to graft GO sheets onto some suitable inorganic nanofibers, which can be further fabricated into a nanofibrous membrane and applied for water purification. Since the linkage between GO and inorganic nanomaterials can be easily destroyed in a basic environment,[18] it is essential to use sulfonic acid functionalized GO with strong nucleophilic capabilities to replace GO. Accordingly, sulfonated GO sheets may be firstly synthesized in an economical process, and subsequently, they were grafted onto inorganic nanofibers to construct hierarchical nanostructures. The sulfonated GO on the inorganic nanofibers can act as a crosslinking agent to assist the interweaving of inorganic nanofibers, resulting in the formation of microfiltration (MF) or ultrafiltration (UF) membranes. Owing to the stable nucleophilic capability of the sulfonic acid functionalized GO, the synthesized membranes can be applied in a wide range of pHs. The synthesized nanofibrous membrane exhibits excellent permeability and selectivity. The produced membrane can thus be used in the MF or UF range by tuning fabrication parameters to finely adjust the ratio of inorganic nanofibers versus the crosslinking agent. Importantly, various inorganic nanofibrous materials such as $TiO_2$ nanofiber, $MnO_2$ nanofiber, $SnO_2$ nanowire, $SrTiO_3$ nanofiber, and $Fe_3O_4$ nanofiber can be chosen as the scaffold of the membrane, which would endow the synthesized membranes with differential properties for multifunctional applications such as catalysis, adsorption, oxidation and disinfection. The invention will be particularly useful in water purification and/or treatment processes.

According to a first exemplary aspect, there is provided a method of fabricating an inorganic fibrous membrane, the method comprising the steps of: grafting sulfonated graphene oxide onto a scaffold of inorganic nanofibers to form a suspension of heterojunctions of the sulfonated graphene oxide and the scaffold; filtering the suspension through a support to obtain heterojunctions on the support; drying the heterojunctions on the support; and removing the support to obtain the inorganic fibrous membrane.

The method may further comprise, before the grafting, forming the cryptomelane-type manganese oxide nanowires.

The method may further comprise, before the grafting, sulfonating graphene oxide to form the sulfonated graphene oxide.

The method may further comprise ultrasonically dispersing the suspension after the grafting and before the filtering.

The filtering may comprise vacuum filtration and the support may comprise a glass filter. According to a second exemplary aspect, there is provided an inorganic fibrous membrane comprising heterojunctions of sulfonated graphene oxide and a scaffold of inorganic nanofibers.

The inorganic fibrous membrane may have a rejection capacity on particles larger than 0.2 μm.

The inorganic fibrous membrane may have pore sizes ranging from 0.05 μm to 0.2 μm.

The inorganic fibrous membrane may have an open porous network of overlapping and interweaving ultra long hierarchical heterojunctions.

For both aspects, the inorganic nanofibers may comprise cryptomelane-type manganese oxide nanowires. Alternatively, the inorganic nanofibers may be selected from the group consisting of: $TiO_2$ nanofiber, $MnO_2$ nanofiber, $SnO_2$ nanowire, $SrTiO_3$ nanofiber, and $Fe_3O_4$ nanofiber.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Exemplary embodiments of the invention will be described with reference to FIGS. 1 to 13 below.

In a first exemplary embodiment of the method (100) of fabricating the inorganic nanofibrous membrane, cryptomelane-type manganese oxide (K-OMS-2) nanowires 10 were used as a scaffold for synthesis of the inorganic nanofibrous membrane. The K-OMS-2 nanowires 10 were synthesized via a hydrothermal method. In a typical procedure, 19.1 mmol of K$_2$SO$_4$, 38.2 mmol of K$_{252}$O$_8$, and 19.1 mmol of MnSO$_4$.H$_2$O were dissolved in 80 ml of deionized water. The solution was then transferred to a 125 ml Teflon-lined stainless-steel autoclave. The autoclave was sealed and heated in an oven at 250° C. for 4 days. The resulting black precipitate was suspended in 1000 ml of deionized water, and stirred vigorously for 12 h. After thorough washing with deionized water to remove remaining ions present in the product, the sample was dried at 105° C. for 24 h.

Graphene oxide (GO) was synthesized according to the modification of Hummer's method[19] from natural graphite. Subsequently, sulfonated GO sheets GO-SO$_3$H were prepared by sulfonating (102) the GO using sodium 2-chloroethanesulfonate hydrate under ultrasonic conditions, and SO$_3$H groups were formed on the GO sheet in this process. To synthesize the crosslinking agent of GO-SO$_3$H, 100 mg of GO sheets, 0-3 g of sodium 2-chloroethanesulfonate hydrate and 0-1500 mg of NaOH were added into 500 ml deionized water, and the suspension was subjected to ultrasonication for 3 h for reaction to take place. Subsequently, 2 mL of concentrated HNO$_3$ was injected into the suspension. After stirring the mixture or suspension for 30 min, the resultant product was centrifuged and washed with ethanol for three times. Finally, the product was dispersed into 200 mL deionized water.

Figure 1:
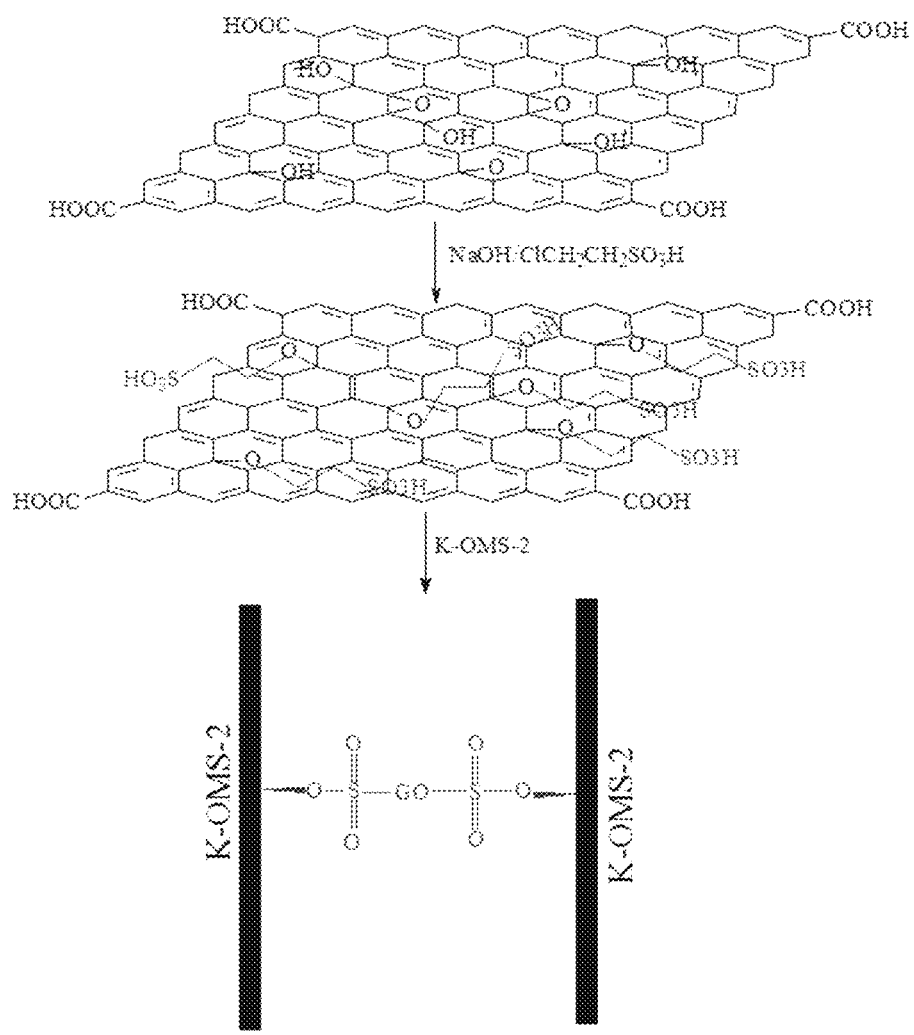
FIG. 1 is a schematic illustration of the formation of K-OMS-2/GO-$SO_3H$.

The sulfonated GO sheets were grafted (104) onto the K-OMS-2 nanofibers to form a hierarchical structure of heterojunctions of the GO-SO$_3$H and the scaffold, as shown in FIG. 1. The GO-SO$_3$H sheets have a strong affinity for the K-OMS-2 nanowires due to the coordination action between the sulfonic acid group and carbonic acid groups of GO-SO$_3$H and the Mn center of the K-OMS-2 nanowire.

Finally, the GO grafted K-OMS-2 nanowires were fabricated into a nanofibrous membrane through flow-directed assembly (106) by filtration. To do so, a suspension of the synthesized hierarchical K-OMS-2/GO-SO$_3$H heterojunctions was first well dispersed under ultrasonic agitation. Then, the suspension was filtered on a vacuum-filtration setup with a glass filter (ADVANTEC, GC-50, 0.45 μm), and the hierarchical K-OMS-2/GO-SO$_3$H heterojunctions will form a compact cake layer on the glass filter which acts as a support for the heterojunctions. Thickness of the membrane can be controlled by the volume of the pulp suspension used/filtered.

Figure 2:
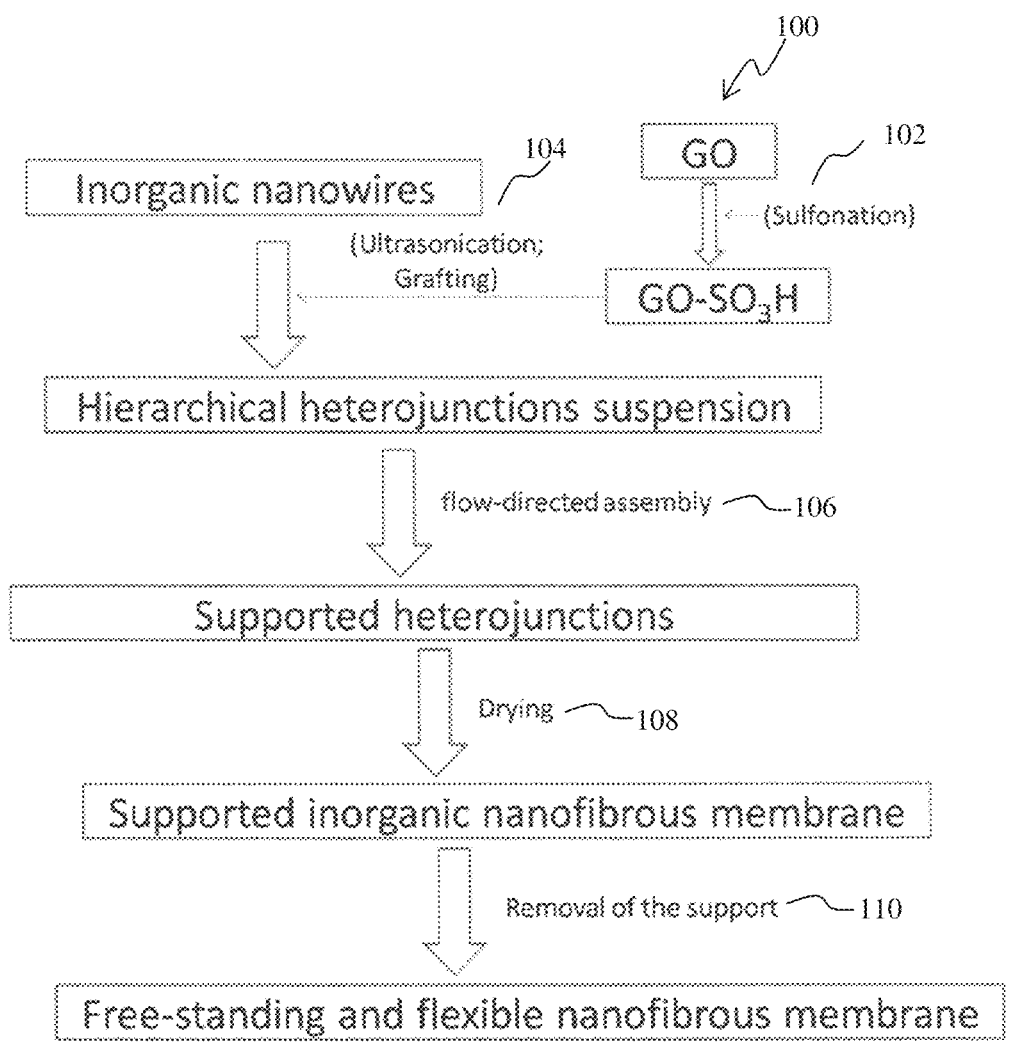
FIG. 2 is flow chart of an exemplary method of fabricating an inorganic nanofibrous membrane.
Figure 3:
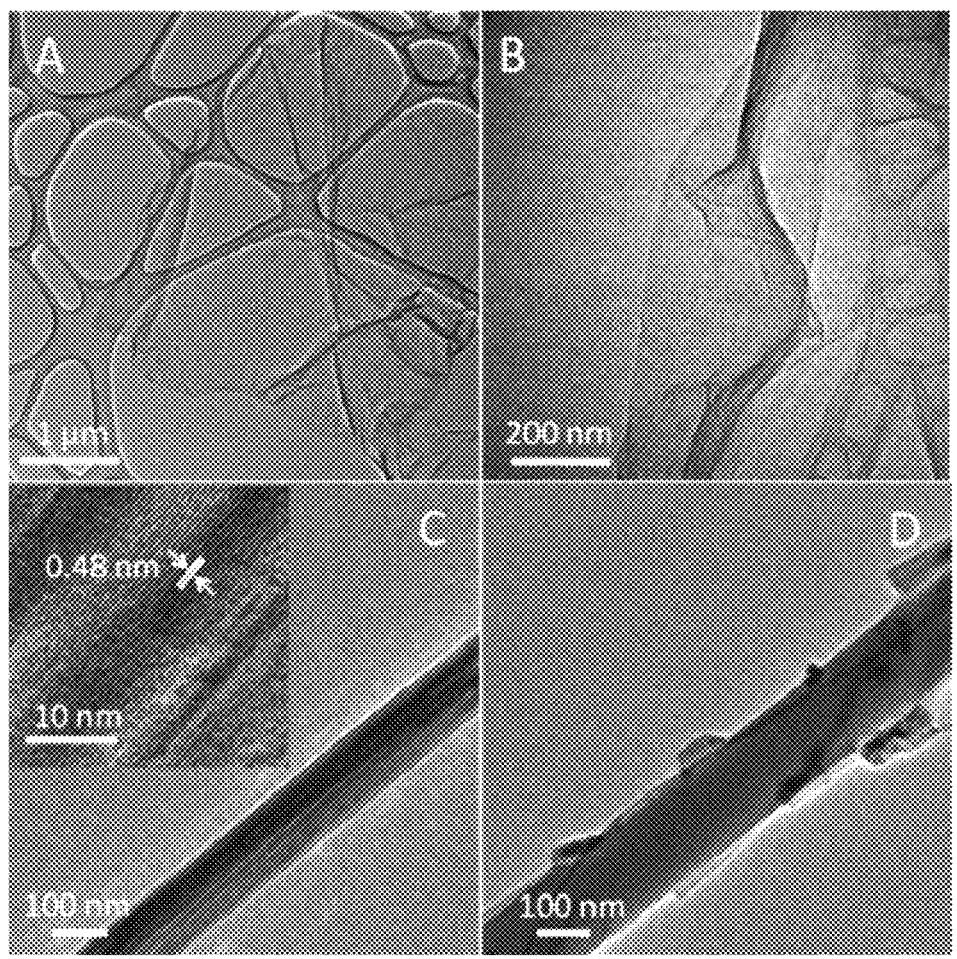
FIG. 3A is a TEM image of GO.
FIG. 3B is a TEM image of a crosslinking agent of GO-$SO_3H$.
FIG. 3C is a TEM image of a K-OMS-2 nanowire.
FIG. 3D is a TEM image of hierarchical K-OMS-2/GO-SO$_3$H heterojunctions.

After drying (108) the supported heterojunctions at 105° C. for 1 day, a free-standing membrane was formed after removal of the glass filter support (110). The fabricated K-OMS-2/GO-SO$_3$H nanofibrous membrane exhibits high permeability and selectivity in water filtration process. A typical procedure to fabricate the graphene based nanocomposites membrane is illustrated in FIG. 2.

Importantly, the presence of functionalized GO can act as a cross linker to assist the interweaving of inorganic nanofibers of the scaffold, resulting in the reduction of membrane pore sizes and the enhancement of the membrane rejection rate. It is also worth noting that the superhydrophilic properties of the K-OMS-2 nanowires and GO-SO$_3$H would enhance the permeability of the synthesized nanofibrous membrane.[6]

The morphology of the synthesized materials was characterized with TEM, and some representative images are summarized in FIGS. 3A to 3D. As shown in FIG. 3A, the synthesized GO sheet is a transparent thin film with diameters of a few micrometers. The wrinkles and folds can be clearly observed, showing the two dimensional structure of the GO sheet.

Figure 4:
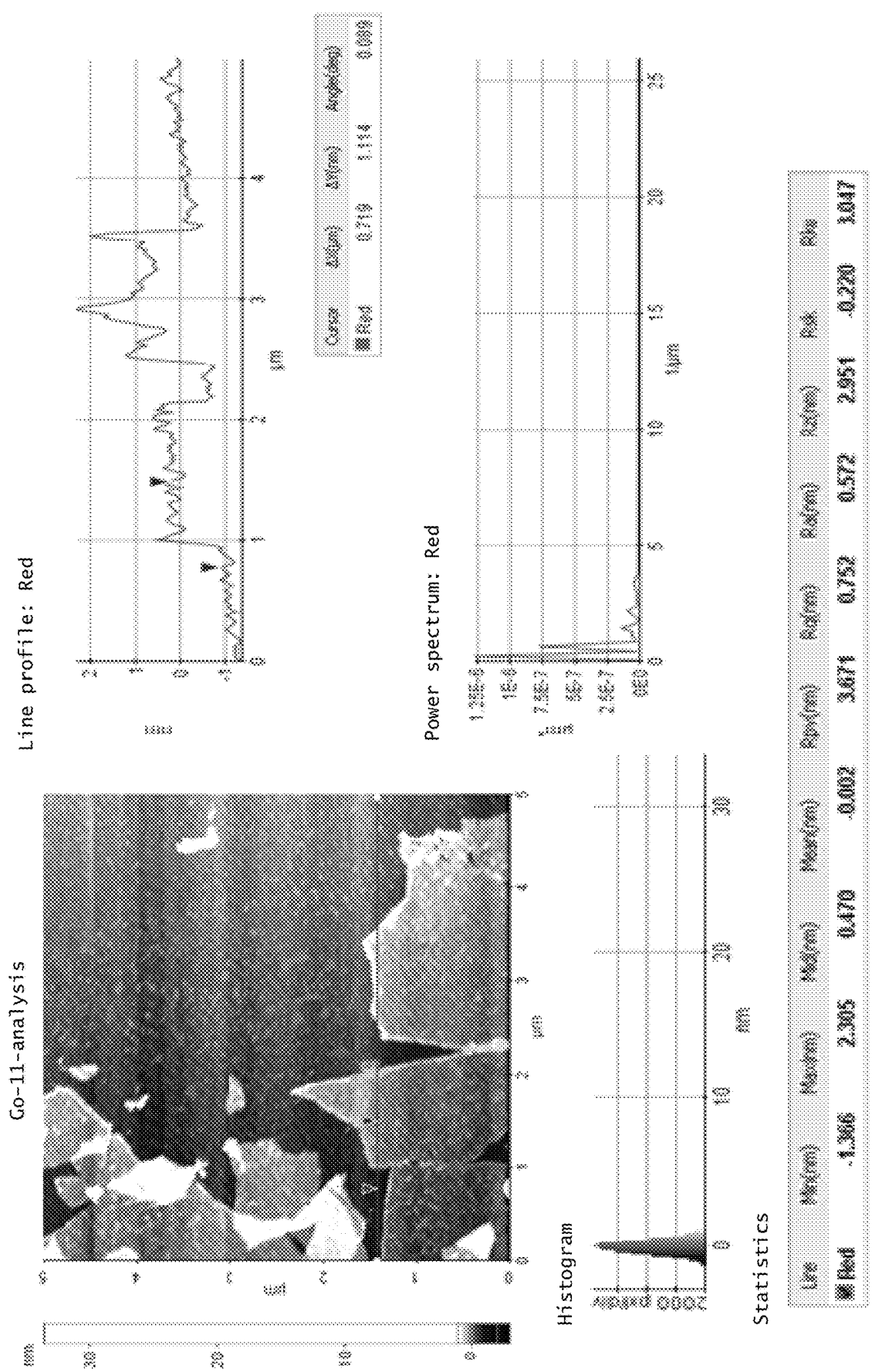
FIG. 4 is an AFM image of single-sheet GO.
Figure 5:
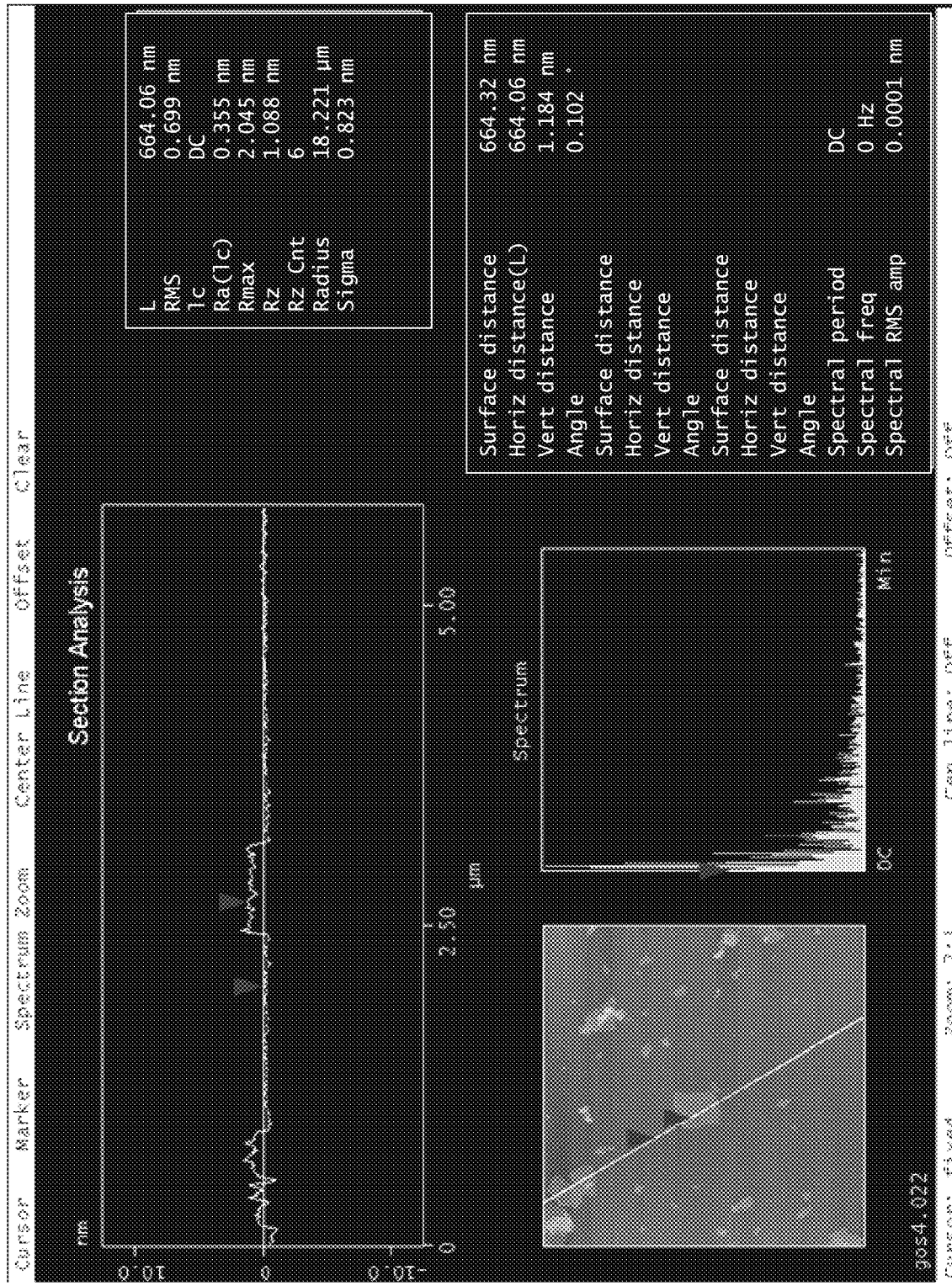
FIG. 5 is an AFM image of single-sheet GO-SO$_3$H.
Figure 6:
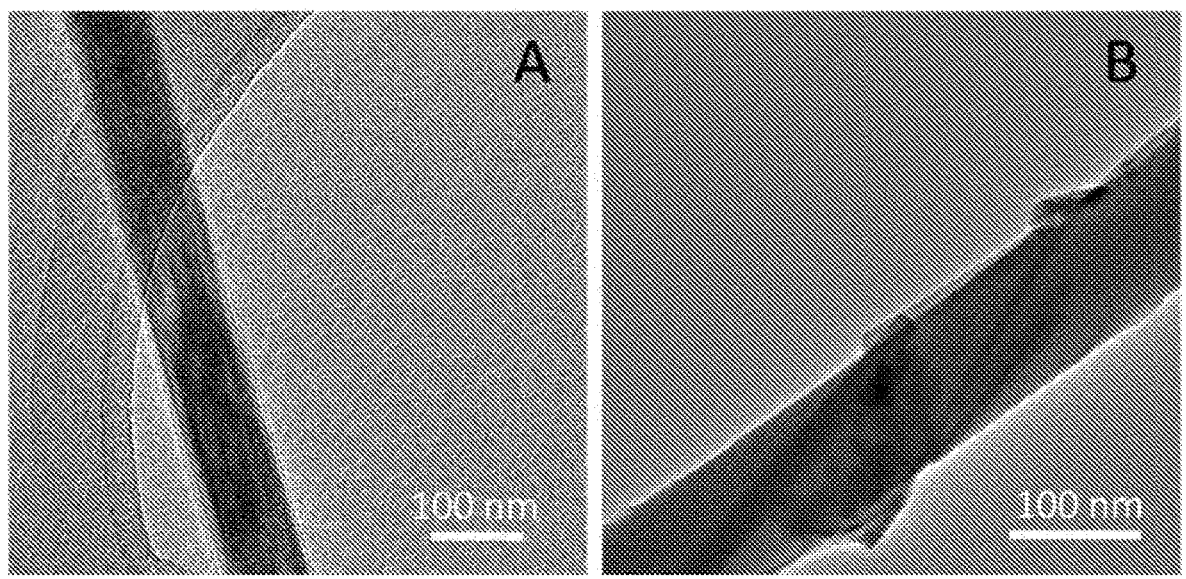
FIG. 6A is a TEM image of K-OMS-2/GO under pH 11.
FIG. 6B is a TEM image of K-OMS-2/GO-SO$_3$H under pH 11.
Figure 7:
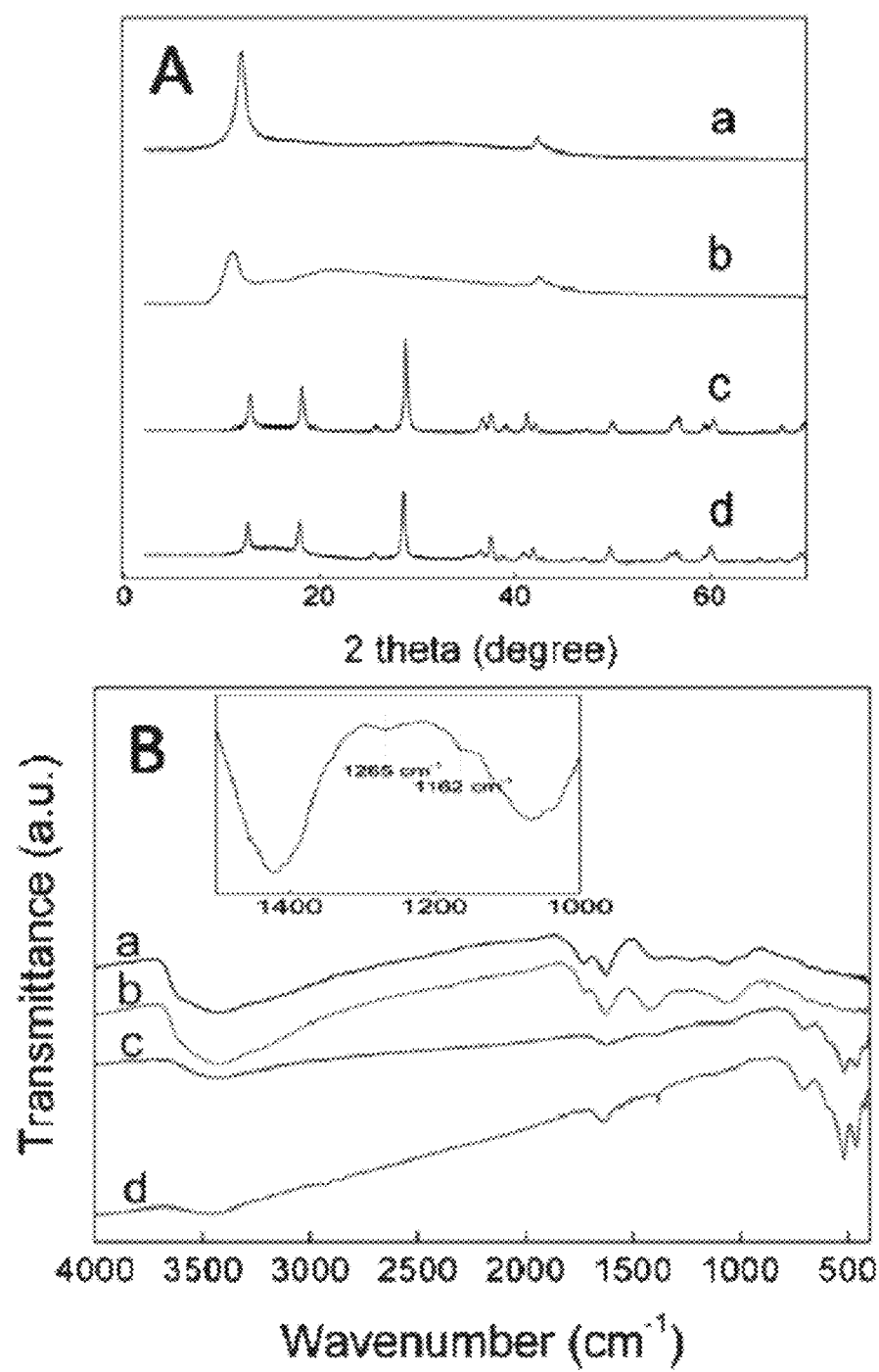
FIG. 7A is XRD spectra of a synthesized (a) GO, (b) GO-SO$_3$H, (c) K-OMS-2, and (d) K-OMS-2/GO—SO$_3$H.
FIG. 7B is FTIR spectra of a synthesized (a) GO, (b) GO-SO$_3$H, (c) K-OMS-2, (d) K-OMS-2/GO—SO$_3$H, (inset) FTIR spectra of GO-SO$_3$H ranging from 1500 cm$^{-1}$ to 1000 cm$^{-1}$.

The sulfonated GO sheet or GO-SO$_3$H is shown in FIG. 2B, which reveals that the GO sheet kept its original morphology after the sulfonation reaction. The GO sheets and GO-SO$_3$H sheets are confirmed as single layer sheets by AFM patterns (FIGS. 4 and 5). In addition, the GO-SO$_3$H sheet is smaller than the GO sheet due to the physical effect of ultrasound, indicating that GO-SO$_3$H sheets have a relatively large contact area with K-OMS-2 nanowires as compared to GO sheets. Thus, the sulfonic acid group has more chance of forming coordinate bonds with the Mn centre of K-OMS-2 nanowires, which would facilitate the grafting of GO-SO$_3$H onto K-OMS-2 nanowires.

K-OMS-2 nanowires were prepared via a hydrothermal method.[6] In a typical process, Mn$^{2+}$ was oxidized by S$_2$O$_8$22 under constant pressure and temperature for 4 days. As shown in FIG. 3C, the K-OMS-2 nanowire is about 100 nm in diameter. HRTEM (inset of FIG. 2C) reveals that the d-spacing of 0.48 nm corresponds to {002} planes of monoclinic K$_{2-x}$Mn$_8$O$_{16}$, which further confirms that the prepared nanowire is K-OMS-2. FIG. 3D shows that the GO-SO$_3$H sheets were successfully grafted onto the K-OMS-2 nanowire, constructing a hierarchical heterojunction.

Owing to the affinity of the sulfonate acid group toward the K-OMS-2 nanowire, GO-SO$_3$H can be used as a cross linker to combine the K-OMS-2 nanowires more tightly, which facilitates the fabrication of a nanofibrous membrane with good selectivity. In previous work,[18] it was found that inorganic nanomaterials could be detached from GO sheets by the addition of NaOH solution. As shown in FIG. 6A, the GO sheets cannot be grafted onto K-OMS-2 nanowires at a pH of less than 11. However, the strong nucleation capability of the sulfonic acid group can ensure the stability of the K-OMS-2/GO-SO$_3$H composite in basic conditions (FIG. 6B), which can extend its applications in water purification.

XRD analysis of the synthesized materials is shown in FIG. 7A. Diffraction patterns of GO and GO-SO$_3$H show the {001} peak of graphite oxide centered at 2θ=11.9° and 10.5°, corresponding to interlayer spacings of 7.43 Å and 7.58 Å respectively.[20] It can be seen that the interlayer spacing of GO-SO$_3$H is slightly larger than that of the original GO, due to the introduction of the ethane sulfonic acid group. Moreover, the XRD pattern of GO-SO$_3$H shows a weak broader peak from the graphitic {002} diffraction plane centered at 2θ=21.95°, which results from the disordered stacking of functionalized graphene sheets.[20] This is caused by the decrease of oxygen containing groups under basic conditions and the transformation from epoxy group to ether group during the functionalization process.[21,22] The XRD pattern of K-OMS-2/GO-SO$_3$H shows clear diffraction peaks from the K-OMS-2 crystalline phase (JCPDS 44-1386), which are very similar to the K-OMS-2 nanowires. No marked reflections from the {001} diffraction plane of GO-SO$_3$H are observed because the regular stacking of GO-SO$_3$H is destroyed by the intercalation of K-OMS-2 nanowires.[18,20]

FIG. 7B shows the FTIR spectra of GO, GO-SO$_3$H, K-OMS-2 and K-OMS-2/GO-SO$_3$H. The FTIR spectrum of GO indicates that the broad band ranging from 3600 cm$^{-1}$ to 3000 cm$^{-1}$ and the band near 1631 cm$^{-1}$ can be assigned to the H—O—H stretching vibrations of adsorbed water molecules.[23] The bands at 1730 cm$^{-1}$ and 1039 cm$^{-1}$ are related to the C=O and C—O stretching vibrations of COOH groups,[24] indicating the graphite was oxidized into hydrophilic GO with hydroxyl and carboxyl groups. For the spectrum of GO-SO$_3$H, the weak band centered at 1265 cm$^{-1}$ and a weak shoulder band centered at 1162 cm$^{-1}$ (inset of FIG. 7B) are respectively attributed to the C—O—C bond stretching vibration and the S=O stretching vibrations of sulfonic acid,[25,26] which reveals that the SO$_3$H group was successfully grafted onto the GO sheet by etherification. For the spectrum of K-OMS-2, the bands centered at 716 cm$^{-1}$ and 531 cm$^{-1}$ result from the characteristic vibrations of the O—Mn—O bonding.[27] After combining with GO-SO$_3$H, the FTIR spectrum of K-OMS-2/GO-SO$_3$H shows a clear band centered at 1390 cm$^{-1}$, which can be attributed to the coordination between Mn and the carboxylic group from GO-SO$_3$H.[28] However, no clear band connected to the coordination between the SO$_3$H group of GO-SO$_3$H and the Mn center can be distinguished, due to the small number of sulfonic groups in the sample.

Figure 8:
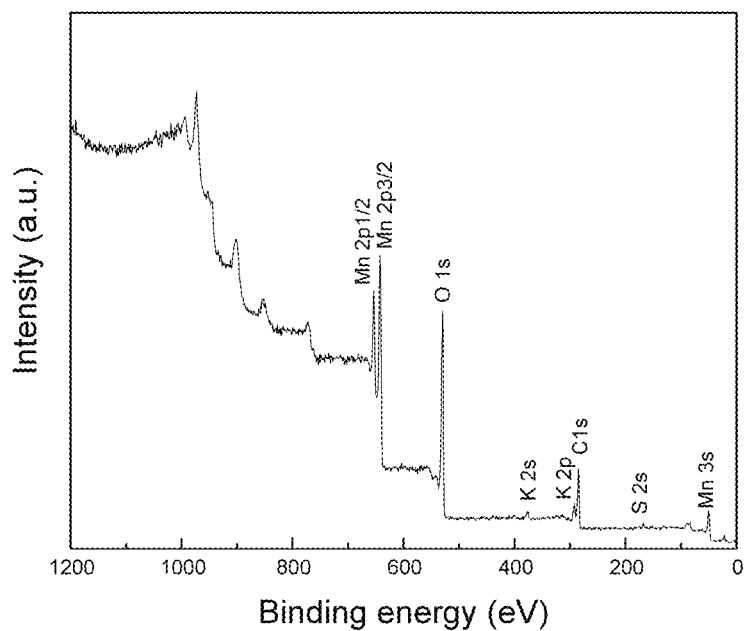
FIG. 8 is an XPS survey spectra of the synthesized K-OMS-2/GO-SO$_3$H.
Figure 9:
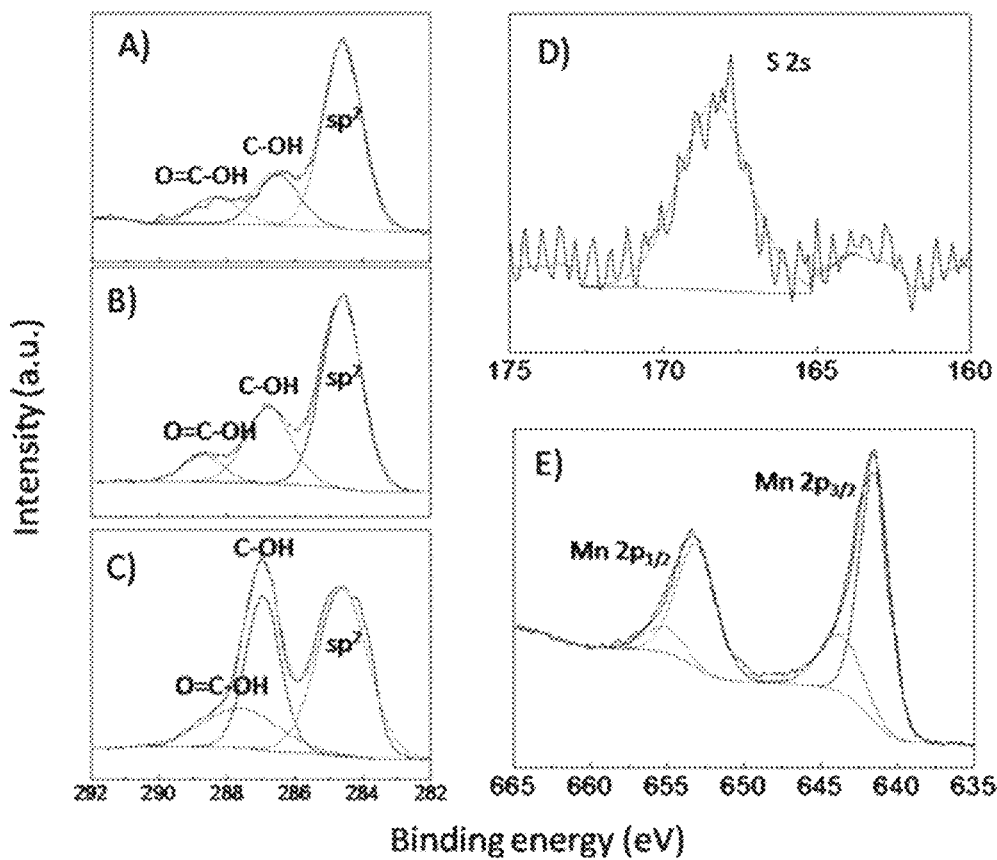
FIG. 9A is high-resolution C 1s XPS spectra of K-OMS-2/GO-SO$_3$H.
FIG. 9B is high-resolution C 1s XPS spectra of GO-SO$_3$H.
FIG. 9C is high-resolution C 1s XPS spectra of GO.
FIG. 9D is high-resolution XPS spectra of Mn 2p taken on K-OMS-2/GO-SO$_3$H.
FIG. 9E is high-resolution XPS spectra of S 2p regions taken on K-OMS-2/GO-SO$_3$H.
Figure 10:
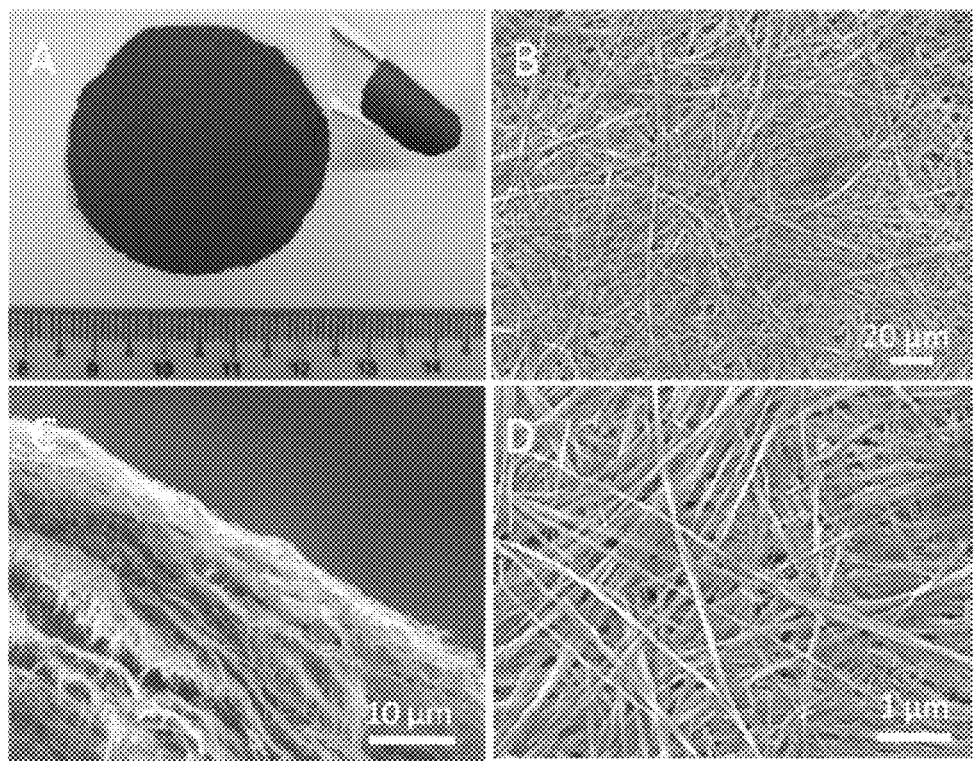
FIG. 10A is a digital photo of a K-OMS-2/GO-SO$_3$H membrane.
FIG. 10B is a top view FESEM image of a K-OMS-2/GO-SO$_3$H membrane.
FIG. 10C is a cross-sectional FESEM image of a K-OMS-2/GO-SO$_3$H membrane.
FIG. 10D is a high-resolution top view FESEM image of a K-OMS-2/GO-SO$_3$H membrane.
Figure 11:
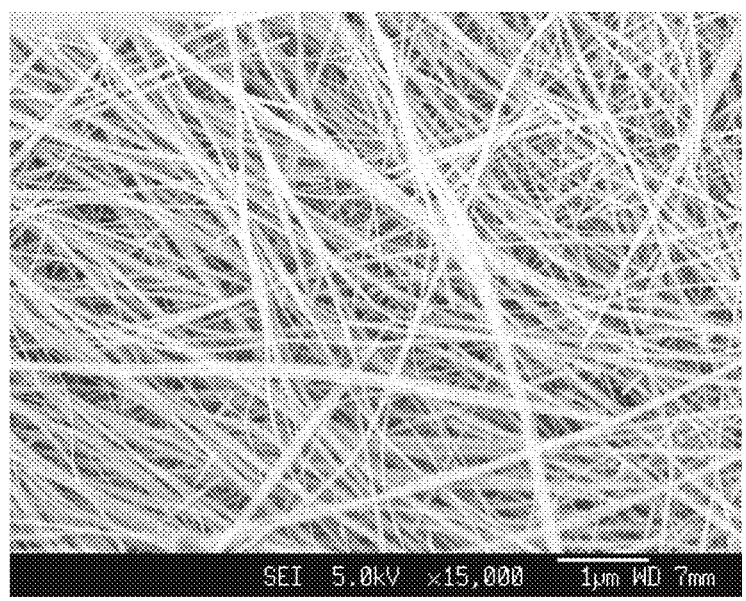
FIG. 11 is a top view FESEM image of the K-OMS-2 nanowire membrane.
Figure 12:
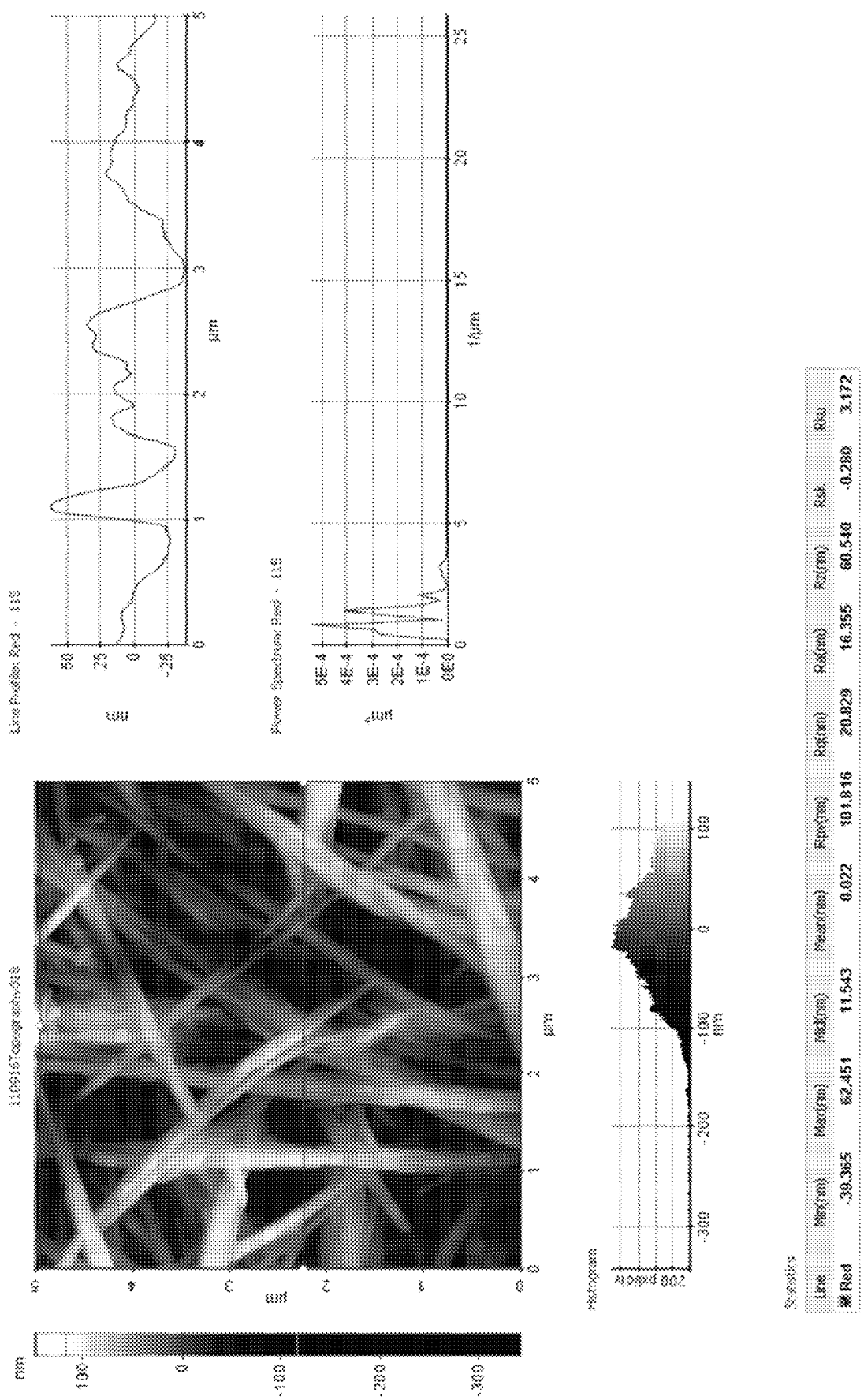
FIG. 12 is an AFM image of the synthesized K-OMS-2/GO-SO$_3$H nanofibrous membrane.
Figure 13:
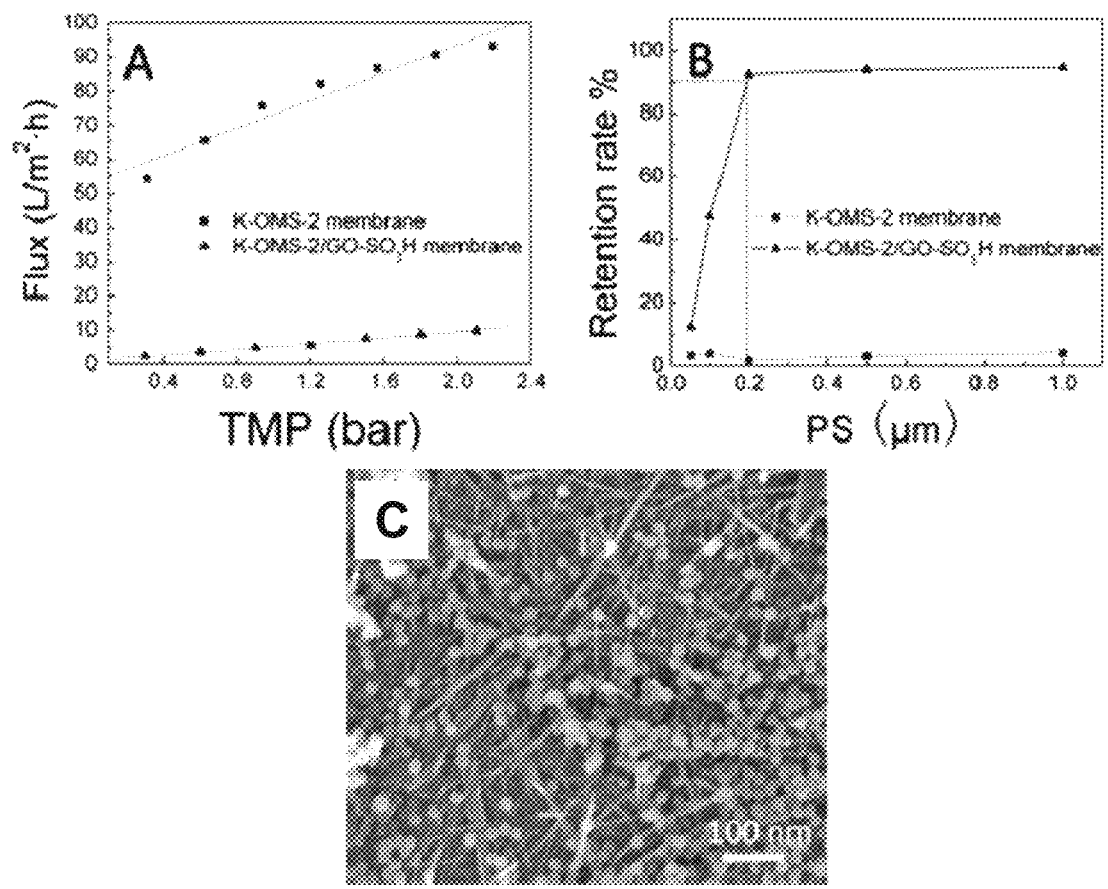
FIG. 13A is a graph of deionized water permeability of the synthesized membranes.
FIG. 13B is a graph of retention rates of standard polystyrene microspheres with different particle sizes by the synthesized membranes at transmembrane pressure of 0.3 bar.
FIG. 13C is an upper-surface FESEM image of a K-OMS-2/GO-SO$_3$H membrane after filtration of a 0.2 μm polystyrene microsphere suspension.

To further identify the SO$_3$H group in the synthesized K-OMS-2/GO-SO$_3$H sample, an XPS measurement was conducted. The survey spectrum of the K-OMS-2/GO-SO$_3$H indicates that the sample contains Mn, C, O, K, and S, as shown in FIG. 8.

FIGS. 9A to 9C show the high resolution XPS spectra of C 1s taken for the different synthesized samples, and the Gaussian curve fittings of C 1s were performed to describe the different carbon bonds in the synthesized materials. Although both the C—OH groups and the HO—C=O groups appeared in all three samples, the C—OH groups are considerably decreased for GO-SO$_3$H and K-OMS-2/GO-SO$_3$H, indicating that the C—OH groups were partly replaced by C—O—SO$_3$H groups during the sulfonation reaction. Furthermore, a single S 2p peak at 168 eV in the high resolution XPS spectrum in FIG. 9D confirms the existence of a SO$_3$H group in the K-OMS-2/GO-SO$_3$H composite.[29,30] FIG. 9E shows the high resolution of Mn 2p, and a Gaussian curve fitting of Mn 2p$_{3/2}$ displays that the Mn 2p$_{3/2}$ binding energies were centered at 641.7 eV and 643.0 eV, representing Mn$^{3+}$ and Mn$^{4+}$ respectively.[31] The strong nucleophilic effect of the SO$_3$H group in GO-SO$_3$H toward Mn atoms can effectively contribute to the combination of K-OMS-2 and GO-SO$_3$H together with coordination between the carboxylic acid groups and Mn atoms.

An inorganic nanofibrous membrane was fabricated using the synthesized K-OMS-2/GO-SO$_3$H heterojunctions via a filtration process. A digital photograph of the synthesized free-standing nanofibrous membrane is shown in FIG. 10A. The 35 mm-diameter membrane was fabricated via a filtration process, and larger diameter membranes could also be produced. The inset of FIG. 10A indicates that the synthesized membrane possesses excellent flexibility, which can be freely shaped by tweezers. FIG. 10B shows a top view FESEM image of the membrane, which reveals a relatively flat topology with no observed cracks. From the high-resolution FESEM image (FIG. 10D), it can be observed that the open porous network was formed by overlapping and interweaving of the ultra long hierarchical K-OMS-2/GO-SO$_3$H heterojunctions, and the membrane pore sizes range from 0.05 μm to 0.2 μm. Compared to the K-OMS-2 nanowire membrane without calcination (FIG. 11), the membrane in FIG. 10D shows much more compact nanowire bundles, due to the presence of GO-SO$_3$H as a cross linker, which downsizes the membrane pore and thus increases the rejection capacity of the membrane in the water purification process. GO-SO$_3$H sheets can enable the K-OMS-2 nanowires to bind together and thus form a free-standing and flexible membrane, which was further confirmed by the AFM image in FIG. 12. In addition, a cross-sectional SEM image (FIG. 10C) of the synthesized membrane reveals that the membrane is composed of many layers, and each layer is assembled by the bundles of hierarchical K-OMS-2/GO-SO$_3$H heterojunctions. The tightly interwoven K-OMS-2/GO-SO$_3$H heterojunctions can endow the membrane with a compact functional layer.

To investigate the permeability of the K-OMS-2/GO-SO$_3$H membrane, membrane fluxes of deionized water under different transmembrane pressures (TMP) were studied in a lab-scale dead-end filtration apparatus. As shown in FIG. 13A, the permeate flux of the K-OMS-2/GO-SO$_3$H membrane is highly correlated with TMP ($R^2$=0.991) since the only resistance present in the experiments is the intrinsic membrane resistance ($R_m$). The K-OMS-2 nanowires were tightly combined because of the crosslinking effect of GO-SO$_3$H, and the K-OMS-2/GO-SO$_3$H membrane flux increased proportionately with increasing TMP. However, in the absence of GO-SO$_3$H, the degree of binding of the nanowires varied with increasing TMP, resulting in the poorly fitted regression line ($R^2$=0.937) in FIG. 13A. Although the K-OMS-2/GO-SO$_3$H membrane has a lower permeability than the K-OMS-2 membrane due to the presence of the GO-SO$_3$H sheets, the GO-SO$_3$H sheets can enhance the separation efficiency of the nanofibrous membrane.

Standard polystyrene (PS) microsphere solutions with different particle sizes were filtered by the synthesized membranes. As shown in FIG. 13B, the synthesized K-OMS-2/GO-SO$_3$H membrane displays a much higher separation efficiency than the K-OMS-2 nanowire membrane, and the retention rates of PS microspheres increase with increasing particle size. Since the pore size of a membrane can be defined as the diameter of latex microspheres which are 90% retained by the membrane,[32] the pore size of the K-OMS-2/GO-SO$_3$H membrane can be characterized as being around 0.2 μm, classifying it under the microfiltration membrane category. FIG. 10C shows that the 0.2 μm PS microspheres can be retained and subsequently accumulated to form a cake layer on the surface of the membrane, and it is predictable that pollutants with larger particle sizes (larger than 0.2 mm) would be efficiently removed by the membrane. The synthesized K-OMS-2/GO-SO$_3$H membrane is milking the profits from both the K-OMS-2 nanowires and the GO-SO$_3$H sheets, and consequently possesses excellent permeability and selectivity.

In conclusion, there has been successfully synthesized a hierarchical K-OMS-2/GO-SO$_3$H heterojunction, and a free-standing, flexible nanofibrous membrane was further fabricated using a filtration method. It is important to note that GO-SO$_3$H can act as a cross linker to combine the K-OMS-2 nanowires, which enhances the rejection capacity of the membrane in the filtration process.

Although the effect of GO-SO$_3$H sheets on the membrane performance can be further investigated, there is no doubt that the synthesized membrane possesses good permeability and selectivity in the water purification process. As a microfiltration membrane, it exhibited excellent rejection capacity on pollutants with particle sizes larger than 0.2 μm. It is thus believed that the synthesized membrane can have great potential in membrane applications. Moreover, this work provides a novel methodology towards the fabrication of nanofibrous membranes using other inorganic nanomaterials with one dimensional structures.

The advantages of using the K-OMS-2/GO-SO$_3$H nanofibrous membrane are: (1) the membrane can be fabricated without a calcination process which can reduce the formation of pinholes and cracks within the membrane as well as energy cost, (2) sulfonated GO sheets act as a crosslinking agent which downsize the membrane pores and thus increase the rejection rate of the membrane in water purification processes, (3) the membrane exhibits excellent flexibility which can be freely shaped, and (4) due to the superhydrophilic property of the K-OMS-2 nanowires and GO-SO$_3$H, the membrane possesses great permeability.

Whilst there has been described in the foregoing description exemplary embodiments of the present invention, it will be understood by those skilled in the technology concerned that many variations in details of design, construction and/or operation may be made without departing from the present invention. For example, other variants of nanofibrous membranes may be fabricated using GO-SO$_3$H as the crosslinking agent and another material as the inorganic nanofibrous scaffold. Accordingly, other inorganic nanofibrous materials such as TiO$_2$ nanofiber, MnO$_2$ nanofiber, SnO$_2$ nanowire, SrTiO$_3$ nanofiber, and Fe$_3$O$_4$ nanofiber can be chosen as the scaffold of the membrane, which would endow the synthesized membranes with differential properties for other multifunctional applications such as catalysis, adsorption, oxidation and disinfection. Exemplary variants of the synthesized membranes are listed below:

MnO$_2$/GO-SO$_3$H nanofibrous membrane
TiO$_2$/GO-SO$_3$H nanofibrous membrane
SrTiO$_3$/GO-SO$_3$H nanofibrous membrane
Ag/GO-SO$_3$H nanofibrous membrane

REFERENCES

1. D. S. Sholl and J. K. Johnson, Science, 2006, 312, 1003-1004.
2. K. Tan and S. K. Ohendorf, J. Membr. Sci., 2007, 305, 287-298.
3. D. Yang, X. Niu, Y. Liu, Y. Wang, X. Gu, L. Song, R. Zhao L. Ma, Y. Shao and X. Jiang, Adv. Mater., 2008, 20, 4770-4775.
4. R. Takemori and H. Kawakami, J. Power Sources, 2010, 195, 5957-5961.
5. H. W. Liang, X. Cao, W. J. Zhang, H. T. Lin, F. Zhou, L. F. Chen and S. H. Yu, Adv. Funct. Mater., 2011, 21, 3851-3858.
6 J. Yuan, X. Liu, O. Akbulut, J. Hu, S. L. Suib, J, Kong and F. Stellacci, Nat. Nanotechnol 2008, 3, 332-336.
7. X. Zhang, T. Zhang, J. Ng and D. D. Sun, Adv. Funcl. Mater., 2009, 19, 3731-3736.
8. Q. Xu and M. A. Anderson, J. Mater. Res., 1991, 6, 1073-1081.
9. T. Zhang, Y. Wang, J. Ng and D. D. Sun, RSC Adv., 2012, 2, 3638,
10. W. Jia, Y. Wang, J. Basu, I. Strout, C. B. Carter, A, Gokirmak and Y. Lei, J. Phys. Chem. C, 2009, 113, 19525-19530,
11. P. Kohli, C. C. Harrell, Z. Cao, R. Gasparac, W. Tan and C. R. Martin, Science, 2004, 305, 984-986.
12. R. Mallada and M. Menéndez, Inorganic membranes: synthesis, characterization and applications, Elsevier, Amsterdam, 2008.
13. X. B. Ke, H. Y. Zhu, X. P. Gao, J. W. Liu and Z. F. Zheng, Adv. Mater., 2007, 19, 785-790.
14. K. Geim, Science, 2009, 324, 1530-1534.
15. N. R. Rao, A. K. Sood, K. S. Subrahmanyam and A. Govindaraj, Angew. Chem., Int. Ed., 2009, 48, 7752-7777,
16. A. Dikin, S. Stankovich, E, J, Zimney, R. D. Piner, G. H. B. Dommett, G. Evmenenko, S. I. Nguyen and R. S. Ruoff, Nature, 2007, 448, 457-460.
17. C. Chen, Q. H. Yang, Y. Yang, W. Lv, Y. Wen, P. X. Hou, M. Wang and H. M. Cheng, Adv. Mater., 2009, 21, 3007-3011,
18. J. Liu, H. Bai, Y. Wang, Z. Liu, X. Zhang and D. D. Sun, Adv. Funct. Mater., 2010, 20, 4175-4181.
19. W. S. Hummers Jr and R. E. Offeman, J. Am. Chem., Soc., 1958, 80, 1339,
20. P. Liu, K. Gong, P. Xiao and M. Xiao, J. Mater. Chem., 2000, 10, 933-935,
21. X. Fan, W. Peng, Y. Li, X. Li, S. Wang, C. T. Mang and F. Zhang, Adv. Mater., 2008, 20, 4490-4493.
22. J. Liu, Y. Wang, S. Xu and D. D. Sun, Mater. Lett., 2010, 64, 2236-2239.

23. T. Szabóa, O, Berkesic and I. Dékáya, Carbon, 2005, 43, 3186-3189.
24. G. I. Titelman, V, Getman, S. Bron, R. L. Khalfin, Y. Cohen and H. Bianco-Peled, Carbon, 2005, 43, 641-649.
25. K. Krishnamoorthy, R. Mohan and S. J. Kim, Appl. Phys. Lett., 2011, 98, 244101.
26. H. M. Li, J. C. Liu, F. M. Zhu and S. A. Lin, Polym. Int., 2001, 50, 421-428.
27. L. Shi, N. Li and C. Wang, J. Hazard. Mater., 2010, 178, 1137-1140.
28. S. J. Parikh and J. Chorover, Geomicrobiol. J., 2005, 22, 207-218.
29. M. Okamura, A. Takagaki, M. Toda, J. N. Kondo, K. Domen, M. Dara and S. Hayashi, Chem. Mater., 2006, 18, 3039-3045.
30. Y. Wu, Z. Fu, D. Yin, Q. Xu, F. Liu, C. Lu and L.Mao, Green Chem., 2010, 12, 696-700.
31. T. Zhang, X. Zhang, J. Ng, H. Yang, J. Liu and D. D. Sun, Chem. Commun., 2011, 47, 1890-1892.
32. S. Nakao, J. Membr. Sci, 1994, 96, 131-165.

The invention claimed is:

1. A method of fabricating a non-calcined inorganic fibrous membrane, the method comprising the steps of:
providing sulfonated graphene oxide in a dispersion;
grafting the sulfonated graphene oxide to inorganic nanofibers by adding the inorganic nanofibers to the dispersion and forming a suspension of heterojunctions, wherein the inorganic nanofibers are selected from the group consisting of: cryptomelane manganese oxide nanowires, $TiO_2$ nanofibers, $MnO_2$ nanofibers, $SnO_2$ nanowires, $SrTiO_3$ nanofibers, and $Fe_3O_4$ nanofibers;
filtering the suspension through a support to obtain a cake layer of the heterojunctions on the support;
drying the cake layer on the support at a non-calcining temperature to provide a non-calcined inorganic fibrous membrane on the support; and
removing the non-calcined inorganic fibrous membrane from the support.

2. The method of claim 1, further comprising, before the step of grafting, sulfonating graphene oxide to form the sulfonated graphene oxide provided in the step of providing sulfonating graphene oxide.

3. The method of claim 1, wherein when the inorganic nanofibers are added to the dispersion to form the suspension, the suspension is ultrasonically dispersed.

4. The method of claim 1, wherein the filtering comprises vacuum filtration and the support comprises a glass filter.

5. The method of claim 1, wherein the non-calcining temperature is 105° C.

* * * * *